No. 653,233. Patented July 10, 1900.

E. R. GODWARD.
EGG BEATER.
(Application filed Apr. 12, 1900.)

(No Model.)

WITNESSES:
Ella L. Giles

INVENTOR
Ernest Robert Godward
BY
ATTORNEYS

THE NORRIS PETERS CO., PHOTO-LITHO., WASHINGTON, D. C.

UNITED STATES PATENT OFFICE.

ERNEST ROBERT GODWARD, OF INVERCARGILL, NEW ZEALAND.

EGG-BEATER.

SPECIFICATION forming part of Letters Patent No. 653,233, dated July 10, 1900.

Application filed April 12, 1900. Serial No. 12,599. (No model.)

*To all whom it may concern:*

Be it known that I, ERNEST ROBERT GODWARD, a subject of the Queen of Great Britain, residing at Invercargill, in the Colony of New Zealand, have invented a new and useful Egg-Beater, of which the following is a specification.

This invention relates to utensils for beating eggs, its object being to provide a portable beater by which eggs may be rapidly and thoroughly beaten.

The beater comprises a cylinder provided with a cap, preferably at both ends, for purposes of cleaning, and secured by a bayonet or other convenient fastening. On the inside and at the center of the caps conical bearings are fixed to receive the ends of a spindle, upon which cutters are mounted. I prefer to make the cutters in two spirals and conical in form, with a flat spiral cutter separating the two spiral cutters; but the form of the cutters may be varied—as, for example, concentric bands with connecting-pieces may be employed or radial cutters of varying lengths, or combinations of these forms may be used. I prefer to make the cutters of tin-plate, for cheapness, cut into bands.

Aeration may be provided by means of valves in the caps.

Washers between the caps and the cylinder make an air-tight joint and prevent escape of the contents while being beaten.

The cylinder is grasped in the hand and vigorously shaken, which operation a cook can perform while walking about and attending to other duties. The beater can be laid down and taken up again during the process of treating the eggs.

The beater is illustrated in the accompanying drawings, which show the form I prefer my invention to take.

Figure 1:
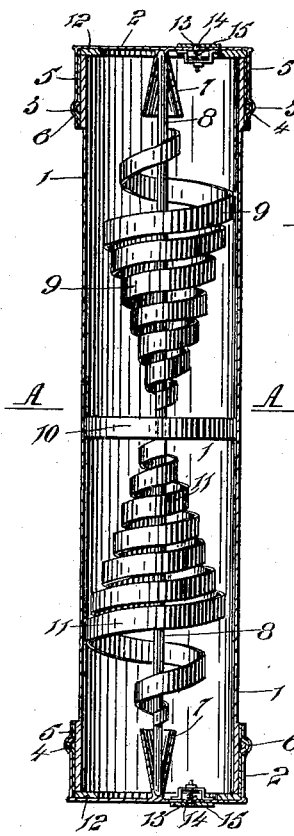
Figure 4:
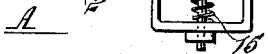
Figure 3:
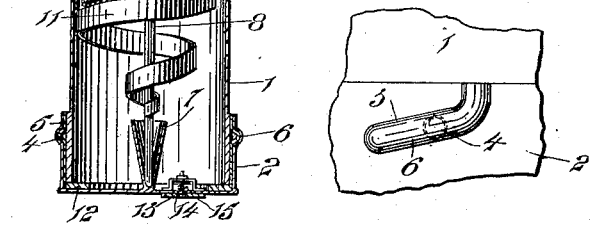
Figure 2:
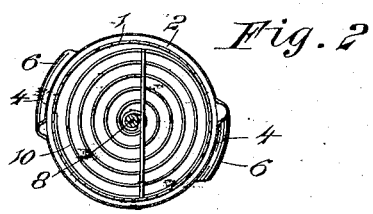

Figure 1 is a longitudinal section of the beater. Fig. 2 is a cross-section on line A A, Fig. 1. Fig. 3 is a view, on a larger scale, of a bayonet-fastening. Fig. 4 represents an air-valve on a larger scale.

Similar figures of reference indicate corresponding parts wherever they occur in the several views.

1 is the cylinder.

2 represents caps fitting upon the ends of the cylinder and held by the bayonet-fastenings 3, of which 4 is a boss formed on the cylinder 1 or a rim 5, attached to the cylinder, and 6 is a channel, part of which forms a spiral upon the lid.

7 represents cups or conical bearings.

8 is a spindle.

9, 10, and 11 are cutters attached to the spindle.

12 represents washers.

13 represents valves opening inward to admit air, but normally held on their seats 14 by light springs 15. In operation the air alternately enters and escapes through the valves.

To use the beater, one lid is removed, the spindle, with its cutters, inserted, and the egg poured in. The lid is replaced by passing the boss 4 within the channel 6 and then turning the lid around and the cylinder shaken while being grasped in the hand. The washers 12 make tight joints between the lid and the cylinder.

The cups 7 are made conical, so that they may readily pass upon the ends of the spindles when the lid is being adjusted.

The details hereinbefore described may be modified, the forms shown representing those which I prefer.

What I claim as my invention, and desire to secure by Letters Patent, is—

1. An egg-beater comprising a cylindrical receptacle, a spindle extending axially thereof from end to end of the same, a coiled cutter arranged transversely of the spindle centrally thereof and conically-coiled cutters on each side of the transverse cutter having their apices arranged adjacent to the transverse cutters, substantially as described.

2. In an egg-beater, the combination of a cylinder, covers fastened to the cylinder by bayonet-joints, a spindle, spiral cutters of thin metal fixed to the spindle and a coiled cutter arranged between the spiral cutters, substantially as set forth.

In witness whereof I have hereunto set my hand in presence of two witnesses.

ERNEST ROBERT GODWARD.

Witnesses:
D. W. McKAY,
W. J. P. HARVEY.